Sept. 30, 1958     E. R. JARMAN     2,854,244
GOLF BAG SUPPORT
Filed Oct. 29, 1956
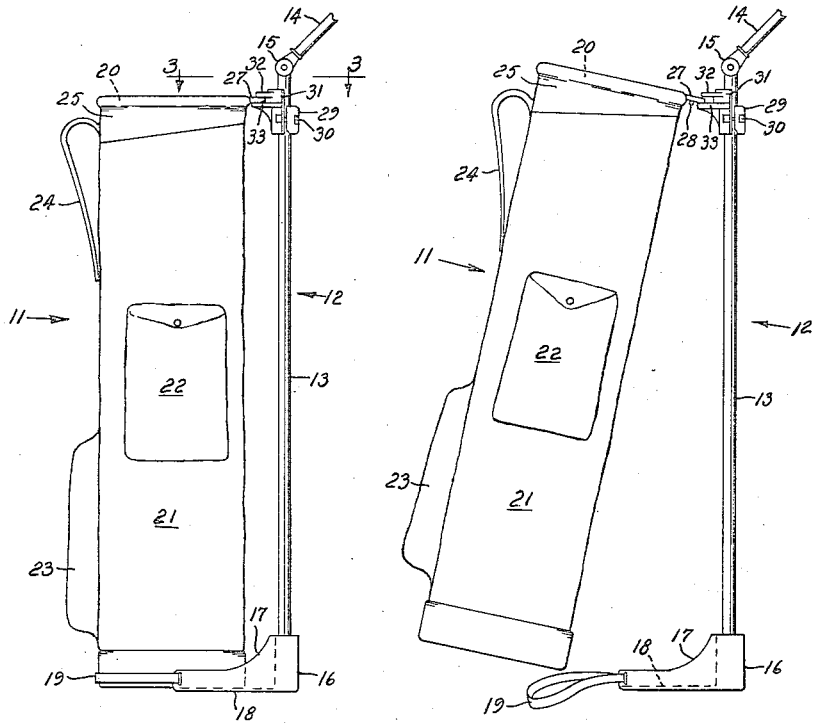
FIG. 1.
FIG. 2.
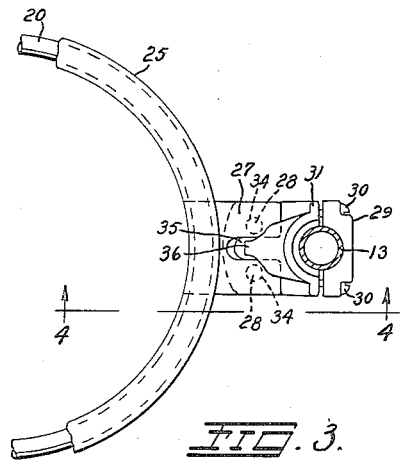
FIG. 3.
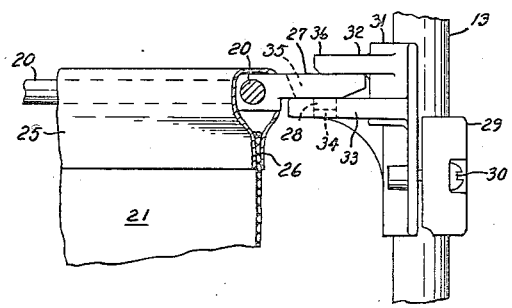
FIG. 4.
INVENTOR
Edward R. Jarman
BY
AGENT

United States Patent Office 2,854,244
Patented Sept. 30, 1958

2,854,244

GOLF BAG SUPPORT

Edward R. Jarman, Portland, Oreg., assignor to Jarman-Williamson Company, Portland, Oreg., a partnership Application October 29, 1956, Serial No. 618,770

3 Claims. (Cl. 280—47.26)

This invention relates generally to a bag for carrying a set of golf clubs and the various other things a golfer carries with him together with a wheeled cart for supporting and transporting the bag of clubs and accessories as the golfers goes around the golf course. It should be noted that these bags are ordinarily made as they were when bags were always carried by the golfer or his caddy and are generally free of ribs or stays for holding the cloth or leather sides of the bag strained longitudinally. In other words, the bags have a tendency to collapse longitudinally. Since the golf bag cart is generally provided with a step on which the bottom of the bag is supposed to rest and straps are provided to tie the bag laterally to the cart at the top and bottom of the bag, the bag tends to slump.

More particularly this invention relates to methods for supporting a golf bag on a golf bag cart and it is a primary object of this invention to provide an improved means for this support.

It is a second object to provide means for supporting on a cart a golf bag so that the bag will be sufficiently suspended from near its top so that the bag will be held gravitationally in a longitudinally taut condition.

It is a third object to provide two part means for supporting a golf bag from near its top in a golf cart the parts being readily separable to remove the bag from the cart.

It is a fourth object to provide such a two part supporting means in which one part is secured to the top of the golf bag and the other part is secured to the cart and in which no additional parts are required to engage the two parts to secure the bag near its top to the cart.

It is a fifth object to provide a rigid metal loop to be built into the top of a golf bag as is usually done to preserve the top opening of the bag in a desired shape and to provide such a loop formed with one part of a two part attachment means for detachably supporting the golf bag by the top end to a golf cart.

How these and other objects are attained is explained in the following description referring to the attached drawing in which, Fig. 1 is a view in side elevation of a simple form of golf bag supported in a position of use in one manner of the practice of this invention to one form of frame of a golf bag cart, the remainder of the cart being omitted as of no part of this invention.

Fig. 2 is a view in side elevation of the bag and cart frame of Fig. 1 in their relative positions of engagement or disengagement of the bag from the cart.

Fig. 3 is fragmentary plan view in partial section as viewed along the line 3—3 of Fig. 1.

Fig. 4 is a fragmentary side elevation in partial section as viewed along the line 4—4 in Fig. 3.

Like numerals of reference refer to like parts in the several figures of the drawing.

Referring now to the drawing, in Fig. 1 is shown generally a golf bag 11 supported near its top in the manner of this invention by a golf cart frame indicated generally by the numeral 12. The cart frame 12, exposed as shown by the omission of the wheels and wheel mounting structure, is seen to comprise a commonly used type of longitudinal basic member 13 with a car manipulating handle member 14 hingedly secured at 15 to the top end of basic member 13, and a foot member 16 secured as shown to the bottom end of basic member 13. Foot member 16, as here shown and as used in the prior art, has a sufficient lateral spread between its sides 17 to receive bag 11 which in the prior art would have been supported on bottom grid 18 of foot member 16 and retained in position by strap 19 as shown in Fig. 1.

In the method here shown for the practice of my invention, bag 11 includes at its top an aluminum loop 20 of a form required to maintain a bag opening at its top of any desired shape. The bag sides 21, and pockets 22, 23 are usually made of flexible fabric trimmed with leather of which also is made handle 24 and top finishing tunnel 25 secured to sides 21 at 26 and enclosing loop 20 as shown in Fig. 4.

Secured to loop 20 to form a rigid part thereof and extending through a cut away opening in tunnel 25 is bracket 27 formed with a pair of laterally spaced pins 28 depending from the bottom face thereof.

Longitudinally adjustably secured on frame member 13 by cap member 29 and screws 30 is double bracket part 31 formed with parallel vertically spaced upper bracket 32 and lower bracket 33 adapted to receive bracket 27 between their adjacent parallel faces as shown in Figure 4. Lower bracket 33 is formed with a pair of laterally spaced holes 34 therethrough adapted to receive pins 28 as shown.

When it is desired to place bag 11 in position for use with the cart the bag is placed as shown in Fig. 2 at an angle of engagement with respect to frame member 13 and bracket 27 of bag 11 is inserted between brackets 32 and 33 of part 31. Then by pivotting bag 11 downwardly on brackets 27, 32 and 33 the lower end of bag 11 enters foot member 16 between its sides 17 and above its bottom 18, where it is secured by strap 19 as shown in Fig. 1. At the same time pins 28 enter holes 34 to latch bracket 27 against lateral translation with respect to bracket part 31. Brackets 32, 33 latch bracket 27 against translation longitudinally of bag 11 or frame member 13.

It is seen that the golf bag support of this invention basically is an interengaging means made up of two separate parts 27 and 31 with part 27 secured to the golf bag and part 31 secured to the golf cart. When it is desired to secure the bag to the cart in their relative positions of use as illustrated in Fig. 1, part 27 must be brought into its relative first engagement position with respect to part 31 as shown in Fig. 2 in which position part 27 is at the angle of engagement with part 31 at which angle part 27 may be translated horizontally toward part 31 with the end 36 of bracket part 32 guiding into slot 35 in part 27 and pins 28 of part 27 clearing bracket part 33 of part 31. When part 27 has been horizontally translated towards part 31 until pins 28 of part 27 are above holes 34 in part 31 then part 27 may be rotated counterclockwise about a horizontal axis until the parts are in their relative angles and positions of use as shown in Fig. 1.

As particularly shown in Figs. 3 and 4, when in their relative angles of use and positions of use, part 27 is prevented from further counterclockwise rotation about part 31 by the upper side of part 27 striking the underside of bracket part 32 of part 31.

By positioning bracket part 31 longitudinally of frame part 13 it is seen that bag 11 can be positioned to be supported sufficiently from its top to keep its sides 21 gravitationally held in any desired condition of strain.

A feature of the particular form in which my invention is here shown to be practiced is the bifurcation at 35 of bracket 27 and the extension 36 formed on bracket 32 adapted to engage bracket 27 at 35 to align bracket 27 with bracket 33 during the engagement of pins 28 in holes 34.

It is understood that many minor modifications of the form of my invention here shown may be made in the practice thereof without departing from the teaching thereof and I intend to hold for myself, all of the novel and useful equivalents of the golf bag supporting devices falling within the scope of the outlined objects and disclosure, and which are defined in the depending claims.

I claim:

1. For use in hanging a golf bag near its top end on a cart for the support and transportation of said bag in a position of full extension, said cart including a first bracket means having an upward facing surface extending laterally from said cart towards said bag, and a second bracket means having a downward facing surface upwardly spaced from said upward facing surface and parallel thereto and said first means including a pair of laterally spaced holes through said upward facing surface approximately perpendicularly thereto, said golf bag including a third bracket means secured to said bag near the top thereof and extending from said bag towards said cart to interengage with said first and second means of said cart between said upwardly and downwardly facing surfaces, said third means including a pair of laterally spaced downwardly extending pins for the purpose of engaging said first means in said holes and said second and third means including interengaging means to guide said third means laterally into engagement of said pins into said holes as said bag is advanced towards said cart in its angle of engagement therewith.

2. A two part interengaging means, one of said parts being adapted to be secured to a golf bag cart and the other of said parts being adapted to be secured to the top of a golf bag to support said bag by its top in a fully longitudinally extended condition, said one of said parts including a pair of vertically spaced brackets laterally extending towards said bag, the lower of said brackets having a greater extension towards said bag than the upper of said brackets and having a pair of spaced holes sunk through the upper surface thereof, the other of said parts including a third bracket laterally extending from said bag towards said cart and having a pair of spaced pins depending from the under side thereof to engage said holes in said lower of said brackets when said third bracket is positioned between said upper and said lower brackets.

3. The interengaging means of claim 2 in which the upper of said brackets includes an extension towards said bag to engage said third bracket to guide said third bracket into engagement of said pins in said hole.

References Cited in the file of this patent

UNITED STATES PATENTS

| | | |
|---|---|---|
| 356,780 | Murtoff | Feb. 1, 1887 |
| 561,082 | Baughman | June 2, 1896 |
| 568,253 | Howard | Sept. 22, 1896 |
| 1,216,941 | Camp | Feb. 20, 1917 |
| 1,548,986 | Donovan | Aug. 11, 1925 |
| 1,802,437 | McHugh | Apr. 28, 1931 |